US011662523B2

(12) United States Patent
Bian et al.

(10) Patent No.: US 11,662,523 B2
(45) Date of Patent: May 30, 2023

(54) EDGE COUPLERS IN THE BACK-END-OF-LINE STACK OF A PHOTONICS CHIP

(71) Applicant: GLOBALFOUNDRIES U.S. Inc., Santa Clara, CA (US)

(72) Inventors: Yusheng Bian, Ballston Lake, NY (US); Roderick A. Augur, Saratoga Springs, NY (US); Kenneth J. Giewont, Hopewell Junction, NY (US); Karen Nummy, Newburgh, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 58 days.

(21) Appl. No.: 17/151,955

(22) Filed: Jan. 19, 2021

(65) Prior Publication Data
US 2022/0229250 A1 Jul. 21, 2022

(51) Int. Cl.
*G02B 6/30* (2006.01)
*G02B 6/42* (2006.01)
*F21V 8/00* (2006.01)
*G02B 6/12* (2006.01)

(52) U.S. Cl.
CPC ........... *G02B 6/305* (2013.01); *G02B 6/0046* (2013.01); *G02B 6/4298* (2013.01); *G02B 6/12002* (2013.01); *G02B 6/12004* (2013.01); *G02B 2006/12147* (2013.01)

(58) Field of Classification Search
CPC ...... G02B 6/00; G02B 6/4298; G02B 6/0046; G02B 6/305; G02B 6/12002; G02B 6/12004; G02B 2006/12147
See application file for complete search history.

(56) References Cited

U.S. PATENT DOCUMENTS

| 10,126,500 | B2 | 11/2018 | Qi et al. | |
| 10,145,758 | B2* | 12/2018 | Traverso | G02B 6/12 |
| 10,197,731 | B2 | 2/2019 | Teng et al. | |
| 10,481,326 | B2* | 11/2019 | Patel | G02B 6/4274 |
| 10,534,136 | B1* | 1/2020 | Puckett | G02B 6/305 |
| 10,718,898 | B1* | 7/2020 | Park | G02B 6/13 |
| 11,029,466 | B2* | 6/2021 | Charles | G02B 6/12002 |
| 11,536,903 | B1* | 12/2022 | Letavic | G02B 6/3636 |
| 2017/0017034 | A1 | 1/2017 | Painchaud et al. | |
| 2019/0094468 | A1* | 3/2019 | Novack | G02B 6/1228 |

(Continued)

OTHER PUBLICATIONS

Dhingra et al. (Eng. Res. Express 2 (2020) 035014) (Year: 2020).*

(Continued)

*Primary Examiner* — Daniel Petkovsek
(74) *Attorney, Agent, or Firm* — Thompson Hine LLP; Anthony Canale (57) ABSTRACT

Structures including an edge coupler and methods of forming a structure including an edge coupler. The structure includes a waveguide core over a dielectric layer and a back-end-of-line stack over the dielectric layer and the waveguide core. The back-end-of-line stack includes a side edge and a truncated layer that is overlapped with a tapered section of the waveguide core. The truncated layer has a first end surface adjacent to the side edge and a second end surface above the tapered section of the waveguide core. The truncated layer is tapered from the first end surface to the second end surface.

17 Claims, 7 Drawing Sheets

(56) References Cited

U.S. PATENT DOCUMENTS

2020/0124797 A1* 4/2020 Li .......................... G02B 6/14

OTHER PUBLICATIONS

Y. Bian, A. Jacob, A. Thomas, B. Peng, M. Rakowski, W. S. Lee, and R. Augur, "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optical Society of America, 2020), paper FTu6E.3.

Niharika Kohli, Michaël Ménard, and Winnie N. Ye, "Efficient TE/TM spot-size converter for broadband coupling to single mode fibers," OSA Continuum 2, 2428-2438 (2019).

Kohli, N., Rahman, B.M.A. & Sharma, E.K., "Improved design for SOI based evanescently coupled multilayer spot-size converter". Opt Quant Electron 49, 229 (2017). https://doi.org/10.1007/s11082-017-1066-8.

Pavel Cheben, Przemek J. Bock, Jens H. Schmid, Jean Lapointe, Siegfried Janz, Dan-Xia Xu, Adam Densmore, André Delâge, Boris Lamontagne, and Trevor J. Hall, "Refractive index engineering with subwavelength gratings for efficient microphotonic couplers and planar waveguide multiplexers," Opt. Lett. 35, 2526-2528 (2010).

T. Barwicz, A. Janta-Polczynski, M. Khater, Y. Thibodeau, R. Leidy, J. Maling, S. Martel, S. Engelmann, J. S. Orcutt, P. Fortier, and W. M. J. Green, "An O-band Metamaterial Converter Interfacing Standard Optical Fibers to Silicon Nanophotonic Waveguides," in Optical Fiber Communication Conference, OSA Technical Digest (online) (Optical Society of America, 2015), paper Th3F.3.

M. Teng, B. Niu, K. Han, S. Kim, Y. Xuan, Y. J. Lee, and M. Qi, "Trident shape SOI metamaterial fiber-to-chip edge coupler," in Optical Fiber Communication Conference (OFC) 2019, OSA Technical Digest (Optical Society of America, 2019), paper Tu2J.6.

Kuanping Shang, Shibnath Pathak, Guangyao Liu, Shaoqi Feng, Siwei Li, Weicheng Lai, and S. J. B. Yoo, "Silicon nitride tri-layer vertical Y-junction and 3D couplers with arbitrary splitting ratio for photonic integrated circuits," Opt. Express 25, 10474-10483 (2017).

L. Rechtman and D. M. Marom, "Refractive Index Grading Optimization for Rectangular Core Fiber," 2020 Optical Fiber Communications Conference and Exhibition (OFC), San Diego, CA, USA, 2020, pp. 1-3.

Mu, X.; Wu, S.; Cheng, L.; Fu, H.Y., "Edge Couplers in Silicon Photonic Integrated Circuits: A Review", Appl. Sci. 2020, 10, 1538. https://doi.org/10.3390/app10041538.

Martin Papes, Pavel Cheben, Daniel Benedikovic, Jens H. Schmid, James Pond, Robert Halir, Alejandro Ortega-Moñux, Gonzalo Wangüemert-Pérez, Winnie N. Ye, Dan-Xia Xu, Siegfried Janz, Milan Dado, and Vladimír Vašinek, "Fiber-chip edge coupler with large mode size for silicon photonic wire waveguides," Opt. Express 24, 5026-5038 (2016).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski, C. Meagher, K. Nummy, A. Aboketaf, J. Ayala, Y. Bian, B. Harris, K. Mclean, K. McStay, A. Sahin, L. Medina, B. Peng, Z. Sowinski, A. Stricker, T. Houghton, C. Hedges, K. Giewont, A. Jacob, T. Letavic, D. Riggs, A. Yu, and J. Pellerin, "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

B. Peng, T. Barwicz, A. Sahin, T. Houghton, B. Hedrick, Y. Bian, M. Rakowski, S. Hu, J. Ayala, C. Meagher, Z. Sowinski, K. Nummy, A. Stricker, J. Lubguban, H. Chen, B. Fasano, I. Melville, Z. Wu, J. K. Cho, A. Jacob, D. Riggs, D. Berger, T. Letavic, A. Yu, J. Pellerin, and K. Giewont, "A CMOS Compatible Monolithic Fiber Attach Solution with Reliable Performance and Self-alignment," in Optical Fiber Communication Conference (OFC) 2020, OSA Technical Digest (Optical Society of America, 2020), paper Th3I.4.

Y. Bian, J. Ayala, U. Meagher, B. Heng, M. Rakowski, A. Jacob, K. Nummy, A. Sticker, Z. Sowmski, A. Sanin, A. Aboketaf, S. Hu, I. Stobert, K. Mclean, L. Medina, K. Dezfulian, B. Harris, S. Krishnamurthy, T. Houghton, W. S. Lee, M. Sorbara, D. Riggs, T. Letavic, A. Yu, K. Giewont, and J. Pellerin, "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.

Y. Bian et al., "3D Integrated Laser Attach Technology on 300-mm Monolithic Silicon Photonics Platform," 2020 IEEE Photonics Conference (IPC), Vancouver, BC, Canada, 2020, pp. 1-2, doi: 10.1109/IPC47351.2020.9252280.

R. S. Tummidi and M. Webster, "Multilayer Silicon Nitride-Based Coupler Integrated into a Silicon Photonics Platform with <1 dB Coupling Loss to a Standard SMF over O, S, C and L Optical Bands," 2020 Optical Fiber Communications Conference and Exhibition (OFC), San Diego, CA, USA, 2020, pp. 1-3.

T. Barwicz et al., "Integrated Metamaterial Interfaces for Self-Aligned Fiber-to-Chip Coupling in Volume Manufacturing," in IEEE Journal of Selected Topics in Quantum Electronics, vol. 25, No. 3, pp. 1-13, May-Jun. 2019, Art No. 4700313, doi: 10.1109/JSTQE.2018.2879018.

Yusheng Bian et al., "Optical Components in the Back-End-of-Line Stack of a Photonics Chip" filed Dec. 31, 2021 as U.S. Appl. No. 17/146,864.

* cited by examiner

EDGE COUPLERS IN THE BACK-END-OF-LINE STACK OF A PHOTONICS CHIP

BACKGROUND

The present invention relates to photonics chips and, more specifically, to structures including an edge coupler and methods of forming a structure including an edge coupler.

Photonics chips are used in numerous applications, such as data communication systems and data computation systems. A photonics chip integrates optical components, such as waveguides, optical switches, couplers, and modulators, and electronic components, such as field-effect transistors, into a unified platform. Among other factors, layout area, cost, and operational overhead may be reduced by the chip-level integration of both types of components.

A photonics chip may include a multilayer stack formed by back-end-of-line processing over the optical components and electronic components. The multilayer stack has interlayer dielectric layers that are arranged in different levels and metal lines that are placed in the interlayer dielectric layers. The interlayer dielectric layers provide electrical isolation, and the metal lines are vertically interconnected by vias. Conventional photonics chips do not place optical components, such as grating couplers or waveguides, in the multilayer stack. Instead, optical components are formed during middle-of-line and front-end-of-line processing, which are followed by back-end-of-line processing to form the multilayer stack.

An edge coupler is commonly used for coupling laser light between an optical fiber and optical components on the photonics chip. The edge coupler may include a narrowed section of a waveguide core that has a significantly smaller mode size than the laser light received from the optical fiber. Edge couplers are fabricated during middle-of-line and front-end-of-line processing along with other optical components of the photonics chip. Due to the large mode size mismatch, direct butt-coupling between the optical fiber and the edge coupler leads to a significant power loss.

Improved structures including an edge coupler and methods of forming a structure including an edge coupler are needed.

SUMMARY

In an embodiment of the invention, a structure for an edge coupler is provided. The structure includes a waveguide core over a dielectric layer and a back-end-of-line stack over the dielectric layer and the waveguide core. The back-end-of-line stack includes a side edge and a truncated layer that is overlapped with a tapered section of the waveguide core. The truncated layer has a first end surface adjacent to the side edge and a second end surface above the tapered section of the waveguide core. The truncated layer is tapered from the first end surface to the second end surface.

In an embodiment of the invention, a method of forming a structure for an edge coupler is provided. The method includes forming a waveguide core over a dielectric layer and forming a back-end-of-line stack over the dielectric layer and the waveguide core. The back-end-of-line stack includes a side edge and a truncated layer overlapped with a tapered section of the waveguide core, the truncated layer has a first end surface adjacent to the side edge and a second end surface above the tapered section of the waveguide core, and the truncated layer is tapered from the first end surface to the second end surface.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
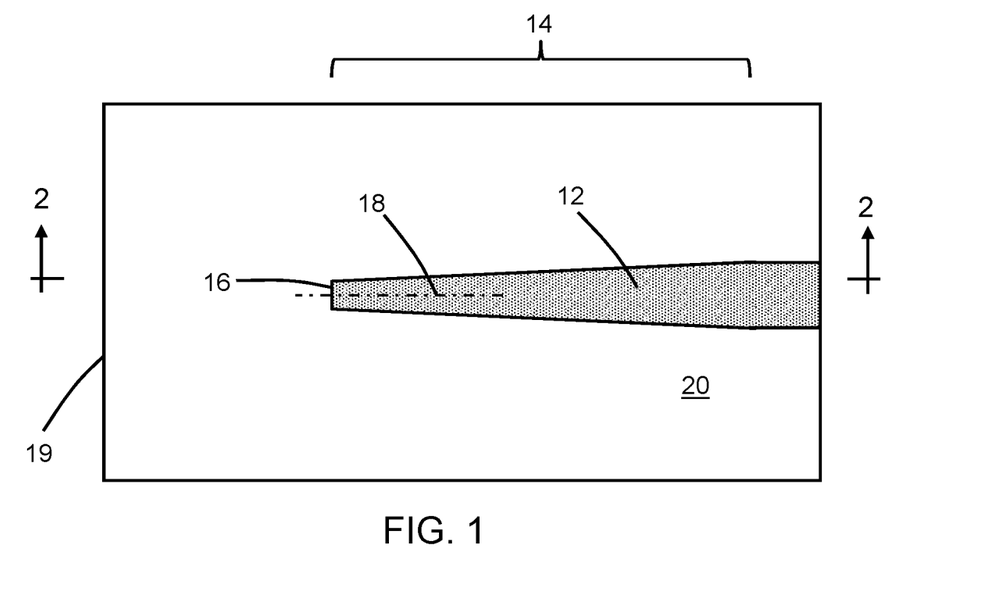
FIG. 1 is a top view of a structure at an initial fabrication stage of a processing method in accordance with embodiments of the invention.
Figure 2:
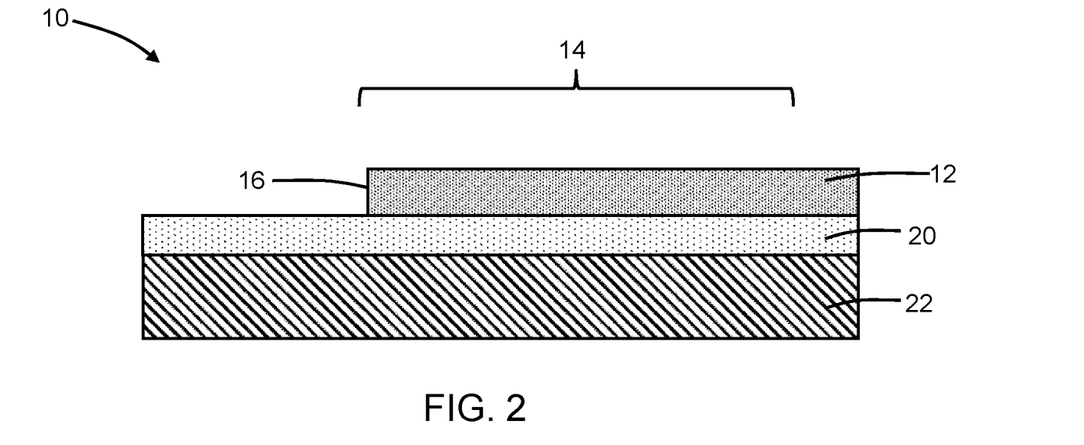
FIG. 2 is a cross-sectional view of the structure taken generally along line 2-2 in FIG. 1.

With reference to FIGS. 1, 2 and in accordance with embodiments of the invention, a structure 10 for a multilayer edge coupler includes a waveguide core 12 having a tapered section 14 of a given length that terminates at an end surface 16. The tapered section 14 of the waveguide core 12 may extend lengthwise along a longitudinal axis 18. The tapered section 14 of the waveguide core 12 may have a width dimension that varies with position along the longitudinal axis 18 and that has a minimum width occurring at the end surface 16 such that the tapered section 14 is tapered in a direction toward the end surface 16. In an embodiment, the width dimension of the tapered section 14 increase with increasing distance from the end surface 16. In an embodiment, the width dimension of the tapered section 14 may vary over its length based on a linear function. In an alternative embodiment, the width dimension of the tapered section 14 may vary over its length based on a non-linear function, such as a quadratic, parabolic, or exponential function.

The waveguide core 12 may be comprised of a single-crystal semiconductor material, such as single-crystal silicon. In an embodiment, the single-crystal semiconductor material may originate from a device layer of a silicon-on-insulator (SOI) substrate that further includes a dielectric layer 20 provided by a buried oxide layer and a substrate 22 comprised of a single-crystal semiconductor material, such as single-crystal silicon. The waveguide core 12 may be patterned from the device layer by lithography and etching processes during front-end-of-line processing. The waveguide core 12 and its tapered section 14 are positioned in a given layer or level over the dielectric layer 20 and the substrate 22, and may be positioned in direct contact with the dielectric layer 20.

The end surface 16 of the tapered section 14 is positioned adjacent to a side edge 19 of the dielectric layer 20 and substrate 22. The end surface 16 is also positioned adjacent to a side edge 49 (FIG. 9) of a back-end-of-line stack 48 that is subsequently formed in the process flow. However, the end surface 16 is laterally spaced from the side edges 19, 49 by a distance that is greater than the conventional spacing because of portions of the structure 10 that are formed in different levels of the back-end-of-line stack 48 and that contribute to the functioning of the structure 10 as an edge coupler.

In an alternative embodiment, the waveguide core 12 may be comprised of a different material than single-crystal silicon. In an alternative embodiment, the waveguide core 12 may be comprised of silicon nitride that is deposited and patterned. In an alternative embodiment, the waveguide core 12 may include a connected slab layer that is produced by partially etching during patterning.

Figure 3:
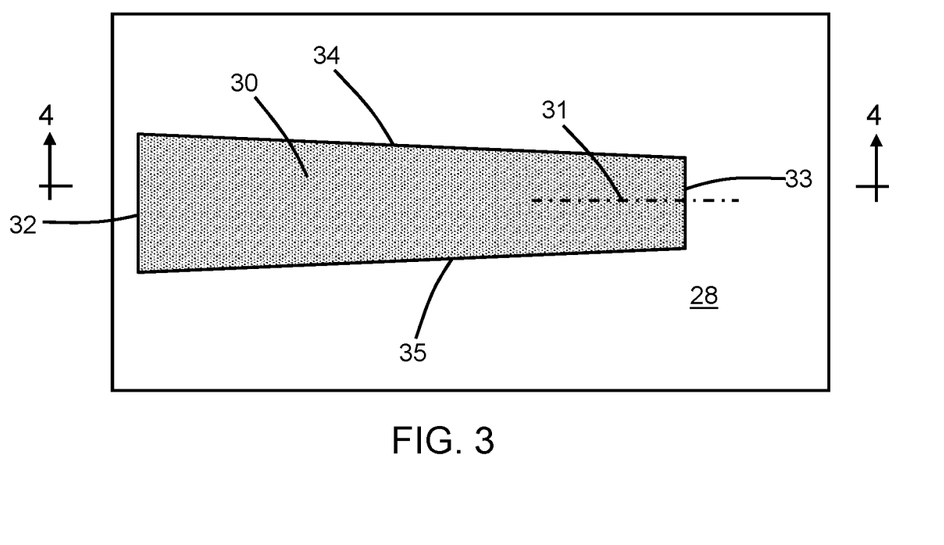
FIG. 3 is a top view of the structure at a fabrication stage subsequent to FIG. 1.
Figure 4:
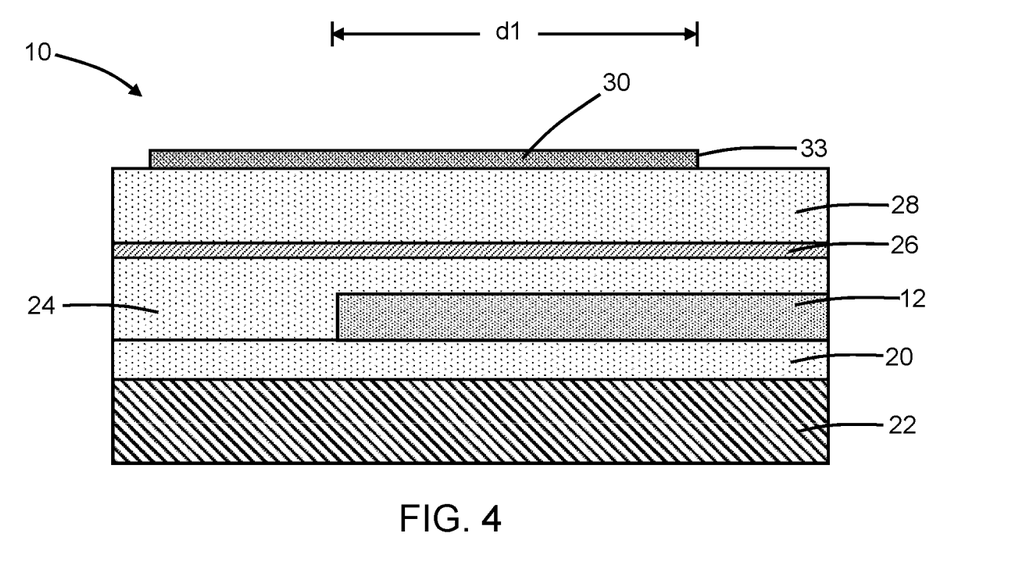
FIG. 4 is a cross-sectional view of the structure taken generally along line 4-4 in FIG. 3.

With reference to FIGS. 3, 4 in which like reference numerals refer to like features in FIGS. 1, 2 and at a subsequent fabrication stage, dielectric layers 24, 26, 28 are formed over the waveguide core 12 and dielectric layer 20. The dielectric layers 24, 28 may be comprised of silicon dioxide, and the dielectric layer 26 may be comprised of silicon nitride. The silicon dioxide comprising the dielectric layers 24, 28 may be formed by plasma-enhanced chemical vapor deposition using ozone and tetraethylorthosilicate (TEOS) as reactants. Alternatively, the silicon dioxide comprising one or more of the dielectric layers 24, 28 may be fluorinated by adding fluorine as an additional reactant during plasma-enhanced chemical vapor deposition. Alternatively, the silicon dioxide comprising the dielectric layers 24, 28 may comprise stacked sublayers containing tetraethylorthosilicate silicon dioxide and fluorinated-tetraethylorthosilicate silicon dioxide. The dielectric layer 26 may have a refractive index that is greater than the respective refractive indices of the dielectric layers 24, 28, and the respective refractive indices of the dielectric layers 24, 26, 28 may be less than the refractive index of the waveguide core 12.

A truncated layer 30 is positioned on the dielectric layer 28. The truncated layer 30 has a finite length and is terminated at its opposite ends by end surfaces 32, 33. The truncated layer 30 extends along a longitudinal axis 31 and has side surfaces 34, 35 that extend lengthwise from the end surface 32 to the end surface 33. In an embodiment, the longitudinal axis 31 of the truncated layer 30 may be aligned parallel to the longitudinal axis 18 of the waveguide core 12.

The truncated layer 30 may be tapered from the end surface 32 to the end surface 33 such that the width dimension between the side surfaces 34, 35 decreases with increasing distance from the end surface 32 and from the side edge 49 (FIG. 9) of the back-end-of-line stack 48. The truncated layer 30 may be tapered in an opposite direction from the tapering of the tapered section 14 of the waveguide core 12. In an embodiment, the truncated layer 30 may be tapered over its entire length with a width dimension that varies with position along the longitudinal axis 31 and that has a minimum width at the end surface 33. In an embodiment, the width dimension of the truncated layer 30 may be equal to about 0.05 times to about 1 times the wavelength of the light (e.g., 1310 nanometers or 1550 nanometers) being received by the structure 10 from an optical fiber. In an embodiment, the truncated layer 30 may have a thickness equal to about 0.03 times to about 0.2 times the wavelength of the light being received by the structure 10 from the optical fiber. In an embodiment, the width dimension of the truncated layer 30 may vary based on a linear function to provide a trapezoidal shape. In an alternative embodiment, the width dimension of the truncated layer 30 may vary based on a non-linear function, such as a quadratic, parabolic, or exponential function.

The dielectric layers 24, 26, 28, which may be formed by middle-of-line processing, may include contacts that are coupled to electronic components, such as field-effect transistors, and active optical components, such as a Mach-Zehnder modulator. The truncated layer 30 may be patterned from a layer that is formed by back-end-of-line processing in the back-end-of-line stack 48.

The truncated layer 30 is comprised of a material that has a different composition than the materials of the dielectric layers 24, 26, 28 and that is available during back-end-of-line processing. In an embodiment, the truncated layer 30 may be comprised of silicon-carbon nitride (e.g., nitrogen-doped silicon carbide (SiCN)) deposited by chemical vapor deposition or plasma-enhanced chemical vapor deposition using reactants that supply silicon, carbon, and nitrogen. In an embodiment, the truncated layer 30 may be comprised of hydrogenated silicon-carbon nitride (e.g., hydrogenated nitrogen-doped silicon carbide (SiCNH)) deposited by chemical vapor deposition or plasma-enhanced chemical vapor deposition using reactants that supply silicon, carbon, nitrogen, and hydrogen. In an alternative embodiment, the truncated layer 30 may be comprised of a dielectric material having a refractive index that is greater than or equal to 1.65.

The truncated layer 30 is positioned in a given layer or level in the back-end-of-line stack 48 over the dielectric layer 20 on the substrate 22. The level of the truncated layer 30 differs in elevation above the dielectric layer 20 from the level of the waveguide core 12 and its tapered section 14. The truncated layer 30 overlaps with a portion of the tapered section 14 of the waveguide core 12 over a distance, d1, that is a fraction of the total length of the truncated layer 30. In an embodiment, the truncated layer 30 may be centered over the tapered section 14 of the waveguide core 12. The narrower end surface 33 of the truncated layer 30 is positioned over the tapered section 14 of the waveguide core 12. The wider end surface 32 of the truncated layer 30 is positioned adjacent to the side edge 49 (FIG. 9) of the back-end-of-line stack 48 and the side edge 19 of the dielectric layer 20 and substrate 22.

Figure 5:
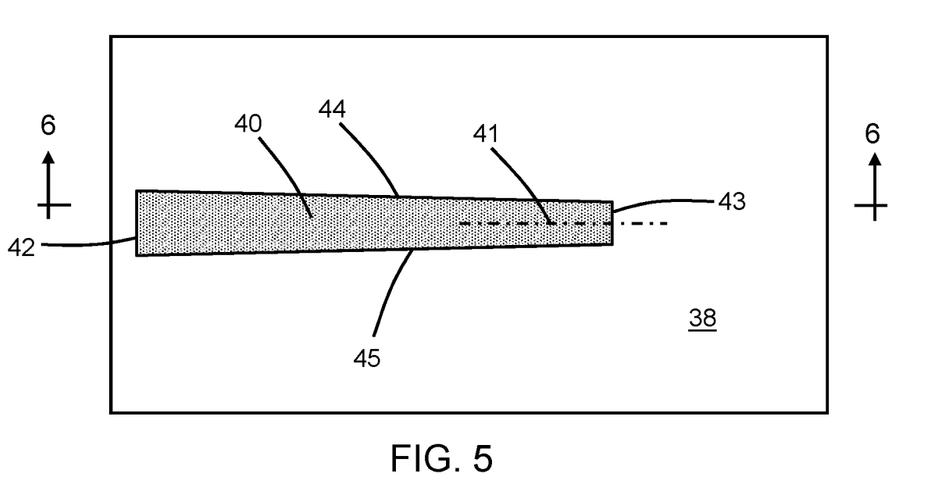
FIG. 5 is a top view of the structure at a fabrication stage subsequent to FIG. 3.
Figure 6:
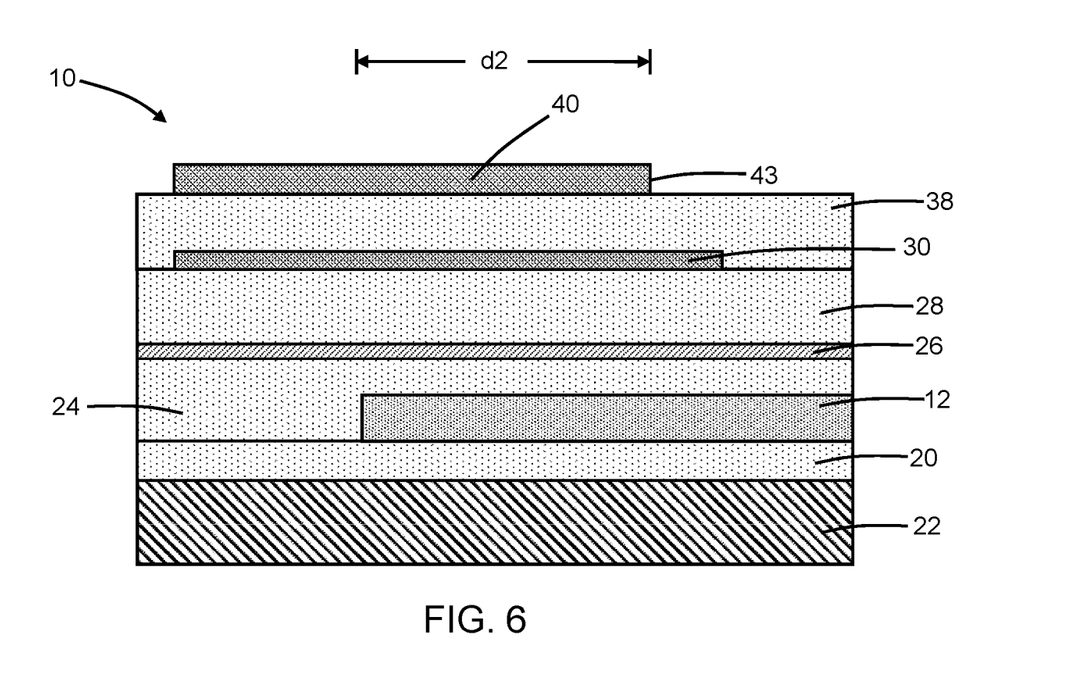
FIG. 6 is a cross-sectional view of the structure taken generally along line 6-6 in FIG. 5.

With reference to FIGS. 5, 6 in which like reference numerals refer to like features in FIGS. 3, 4 and at a subsequent fabrication stage, a dielectric layer 38 is formed over the truncated layer 30 and dielectric layer 28. The dielectric layer 38 may be comprised of silicon dioxide (e.g., tetraethylorthosilicate silicon dioxide and/or fluorinated-tetraethylorthosilicate silicon dioxide) that is deposited and planarized by chemical-mechanical polishing.

A truncated layer 40 is positioned on the dielectric layer 38. The truncated layer 40 has a finite length and is terminated at its opposite ends by end surfaces 42, 43. The truncated layer 40 extends along a longitudinal axis 41 and has side surfaces 44, 45 that extend lengthwise from the end surface 42 to the end surface 43. In an embodiment, the longitudinal axis 41 may be aligned parallel to the longitudinal axes 18, 31.

The truncated layer 40 may be tapered from the end surface 42 to the end surface 43 such that the width dimension between the side surfaces 44, 45 decreases with increasing distance from the end surface 42 and from the side edge 49 (FIG. 9) of the back-end-of-line stack 48. The truncated layer 40 may be tapered in an opposite direction from the tapering of the tapered section 14 of the waveguide core 12 and in the same direction as the tapering of the truncated layer 30. In an embodiment, the truncated layer 40 may be tapered over its entire length with a width dimension that varies with position along the longitudinal axis 41 and that has a minimum width at the end surface 43. In an embodiment, the width dimension of the truncated layer 40 may be equal to about 0.05 times to about 0.3 times the wavelength of the light (e.g., 1310 nanometers or 1550 nanometers) being received by the structure 10 from an optical fiber. In an embodiment, the truncated layer 40 may have a thickness equal to about 0.03 times to about 0.2 times the wavelength of the light being received by the structure 10 from the optical fiber. In an embodiment, the width dimension of the truncated layer 40 may vary based on a linear function to provide a trapezoidal shape. In an alternative embodiment, the width dimension of the truncated layer 40 may vary based on a non-linear function, such as a quadratic, parabolic, or exponential function.

The truncated layer 40 may be comprised of a dielectric material having the same composition as the dielectric material of the truncated layer 30. In an embodiment, the truncated layer 40 may be comprised of either nitrogen-doped silicon carbide or hydrogenated nitrogen-doped silicon carbide. In an alternative embodiment, the truncated layer 30 may be comprised of a dielectric material having a refractive index that is greater than or equal to 1.65. The truncated layer 40 may be patterned from a layer that is formed by back-end-of-line processing in the back-end-of-line stack 48.

The truncated layer 40 is positioned in a given layer or level in the back-end-of-line stack 48 over the dielectric layer 20 on the substrate 22. The level of the truncated layer 40 differs in elevation above the dielectric layer 20 from the level of the waveguide core 12 and its tapered section 14 and also differs in elevation above the dielectric layer 20 from the level of the truncated layer 30. The narrower end surface 43 of the truncated layer 40 is positioned over the tapered section 14 of the waveguide core 12 and also positioned over the truncated layer 30. The wider end surface 42 of the truncated layer 40 is positioned adjacent to the side edge 49 (FIG. 9) of the back-end-of-line stack 48 and the side edge 19 of the dielectric layer 20 and substrate 22.

The truncated layer 40 overlaps with a portion of the tapered section 14 of the waveguide core 12 over a distance, d2. In an embodiment, the distance, d2, may be less than the distance, d1, of overlap between the truncated layer 30 and the tapered section 14. In an embodiment, the truncated layer 40 may be centered over the tapered section 14 of the waveguide core 12. In an embodiment, the truncated layer 40 may be centered over the truncated layer 30. In an embodiment, the truncated layer 40 may be centered over the truncated layer 30 and the tapered section 14 of the waveguide core 12.

Figure 7:
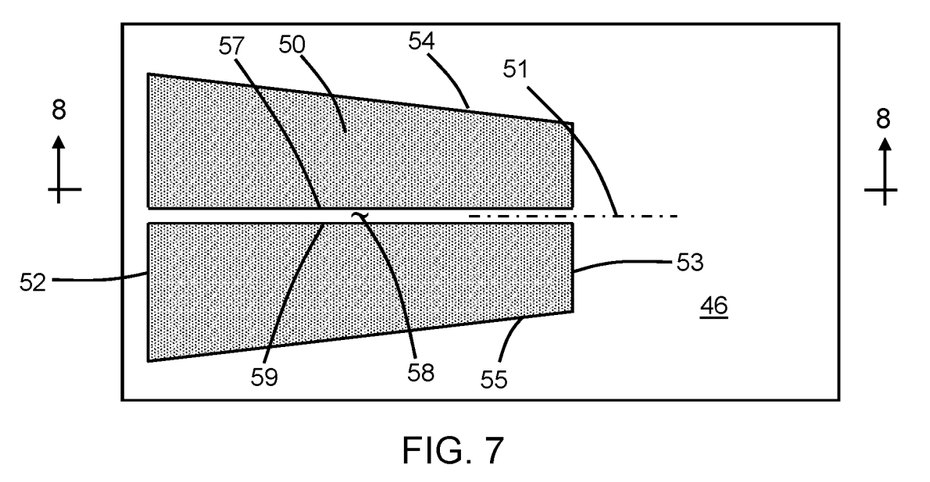
FIG. 7 is a top view of the structure at a fabrication stage subsequent to FIG. 5.
Figure 8:
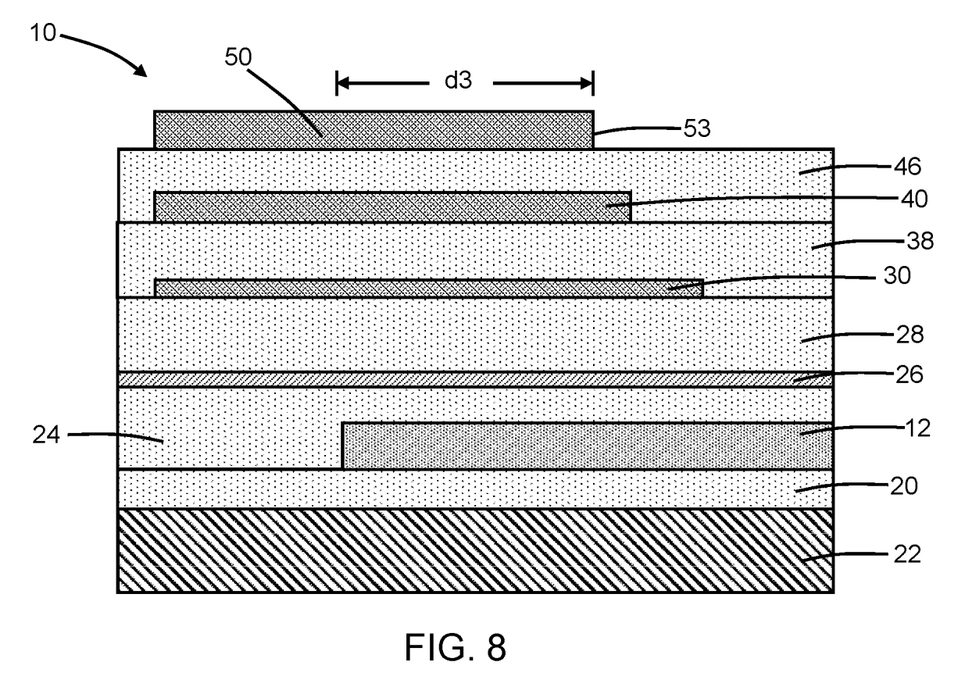
FIG. 8 is a cross-sectional view of the structure taken generally along line 8-8 in FIG. 7.

With reference to FIGS. 7, 8 in which like reference numerals refer to like features in FIGS. 5, 6 and at a subsequent fabrication stage, a dielectric layer 46 is formed over the truncated layer 40 and dielectric layer 38. The dielectric layer 46 may be comprised of silicon dioxide (e.g., tetraethylorthosilicate silicon dioxide and/or fluorinated-tetraethylorthosilicate silicon dioxide) that is deposited and planarized by chemical-mechanical polishing.

A truncated layer 50 is positioned on the dielectric layer 46. The truncated layer 50 has a finite length and is terminated at its opposite ends by end surfaces 52, 53. The truncated layer 50 extends along a longitudinal axis 51 and has side surfaces 54, 55 that extend lengthwise from the end surface 52 to the end surface 53. In an embodiment, the longitudinal axis 51 may be aligned parallel to the longitudinal axes 18, 31, 41.

The truncated layer 50 may be tapered from the end surface 52 to the end surface 53 such that the width dimension between the side surfaces 54, 55 decreases with increasing distance from the end surface 52 and from the side edge 49 (FIG. 9) of the back-end-of-line stack 48. The truncated layer 50 may be tapered in an opposite direction from the tapering of the tapered section 14 of the waveguide core 12 and in the same direction as the tapering of the truncated layers 30, 40. In an embodiment, the truncated layer 50 may be tapered over its entire length with a width dimension that varies with position along the longitudinal axis 51 and that has a minimum width at the end surface 53. In an embodiment, the width dimension of the truncated layer 50 may vary based on a linear function to provide a trapezoidal shape. In an alternative embodiment, the width dimension of the truncated layer 50 may vary based on a non-linear function, such as a quadratic, parabolic, or exponential function.

The truncated layer 50 may be comprised of a dielectric material having the same composition as the dielectric material(s) of the truncated layers 30, 40. In an embodiment, the truncated layer 50 may be comprised of either nitrogen-doped silicon carbide or hydrogenated nitrogen-doped silicon carbide. In an alternative embodiment, the truncated layer 50 may be comprised of a dielectric material having a refractive index that is greater than or equal to 1.65. The truncated layer 50 may be patterned from a layer that is formed by back-end-of-line processing in the back-end-of-line stack 48.

The truncated layer 50 may include a slot 58 that extends parallel to the longitudinal axis 51. In an embodiment, the slot 58 may extend along the entire length of the truncated layer 50 such that the truncated layer 50 is divided into distinct sections. In an embodiment, the slot 58 may penetrate through the full thickness of the truncated layer 50. In an embodiment, the truncated layer 50 may be bisected by the slot 58. The truncated layer 40, which is positioned below the truncated layer 50, may be aligned with the slot 50. In an embodiment, the width of the truncated layer 40 may be less than or equal to the width of the slot 58. In an embodiment, the width of the truncated layer 40 may be greater than the width of the slot 58 to provide an overlapped arrangement with strips of the truncated layer 50 bordering the edges 57, 59 of the slot 58. The truncated layer 30, which is also positioned below the truncated layer 50, may be aligned with the slot 58. In an embodiment, the width of the truncated layer 30 may be greater than the width of the slot 58 to provide an overlapped arrangement with strips of the truncated layer 50 bordering the edges 57, 59 of the slot 58. In an embodiment, the width dimension of the slot 58 may be equal to about 0.5 times to about 0.3 times the wavelength of the light (e.g., 1310 nanometers or 1550 nanometers) being received by the structure 10 from an optical fiber. In an embodiment, the width dimension of the slot 58 may be constant over its length. In an alternative embodiment, the width dimension of the slot 58 may be tapered. In an embodiment, the width dimension of each section of the truncated layer 50 may be greater than 0.6 times the wavelength of the light being received by the structure 10 from the optical fiber. In an embodiment, the truncated layer 50 may have a thickness equal to about 0.03 times to about 0.2 times the wavelength of the light being received by the structure 10 from the optical fiber.

The truncated layer 50 is positioned in a given layer or level in the back-end-of-line stack 48 over the dielectric layer 20 on the substrate 22. The level of the truncated layer 50 differs in elevation above the dielectric layer 20 from the level of the waveguide core 12 and its tapered section 14 and differs in elevation above the dielectric layer 20 from the respective levels of the truncated layers 30, 40. The narrower end surface 53 of the truncated layer 50 is positioned over the tapered section 14 of the waveguide core 12 and also over the truncated layers 30, 40. The wider end surface 52 of the truncated layer 50 is positioned adjacent to the side edge 49 (FIG. 9) of the back-end-of-line stack 48 and the side edge 19 of the dielectric layer 20 and substrate 22.

The truncated layer 50 overlaps with a portion of the tapered section 14 of the waveguide core 12 over a distance, d3. In an embodiment, the distance, d3, may be less than the distance, d2, of overlap between the truncated layer 40 and the tapered section 14 and less than the distance, d1, of overlap between the truncated layer 30 and the tapered section 14. In an embodiment, the truncated layer 50 may be centered over the tapered section 14 of the waveguide core 12. In an embodiment, the truncated layer 50 may be centered over one or both of the truncated layers 30, 40. In an embodiment, the truncated layer 50 may be centered over both of the truncated layers 30, 40. In an embodiment, the truncated layer 50 may be centered over the truncated layers 30, 40 and the tapered section 14 of the waveguide core 12. In an embodiment, the slot 58 in the truncated layer 50 may be centered over the truncated layer 30, the truncated layer 40, and/or the tapered section 14 of the waveguide core 12.

Figure 9:
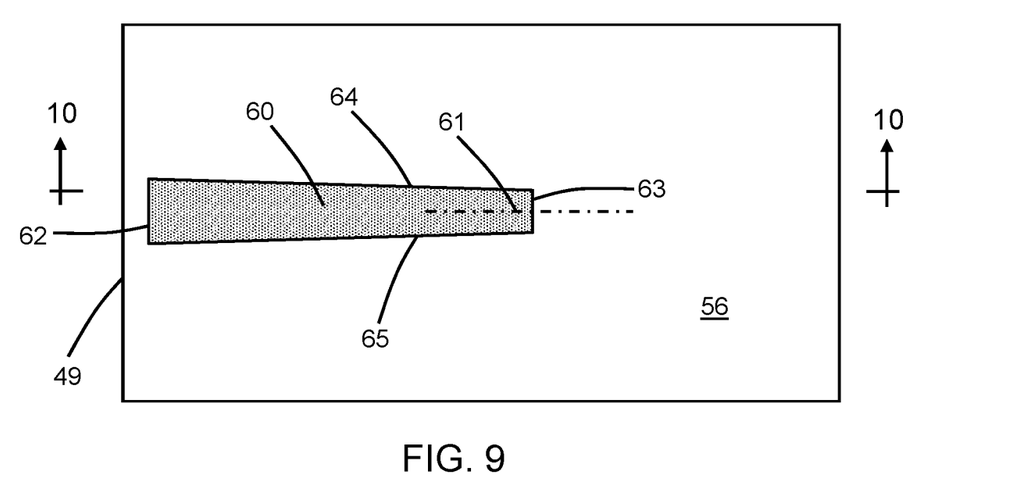
FIG. 9 is a top view of the structure at a fabrication stage subsequent to FIG. 7.
Figure 10:
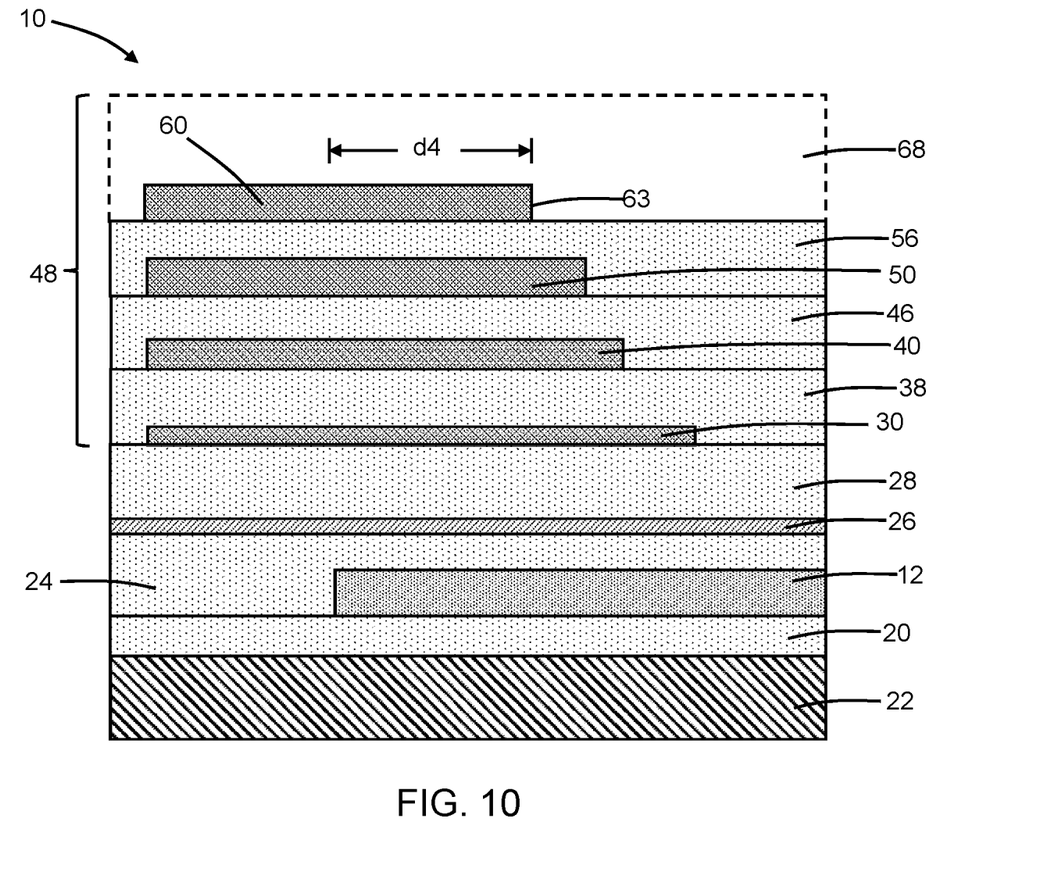
FIG. 10 is a cross-sectional view of the structure taken generally along line 10-10 in FIG. 9.

With reference to FIGS. 9, 10 in which like reference numerals refer to like features in FIGS. 7, 8 and at a subsequent fabrication stage, a dielectric layer 56 is formed over the truncated layer 50 and dielectric layer 46. The dielectric layer 56 may be comprised of silicon dioxide (e.g., tetraethylorthosilicate silicon dioxide and/or fluorinated-tetraethylorthosilicate silicon dioxide) that is deposited and planarized by chemical-mechanical polishing.

A truncated layer 60 is positioned on the dielectric layer 56. The truncated layer 60 has a finite length and is terminated at its opposite ends by end surfaces 62, 63. The truncated layer 60 extends along a longitudinal axis 61 and has side surfaces 64, 65 that extend lengthwise from the end surface 62 to the end surface 63. In an embodiment, the longitudinal axis 61 may be aligned parallel to the longitudinal axes 18, 31, 41, 51.

The truncated layer 60 may be tapered from the end surface 62 to the end surface 63 such that the width dimension between the side surfaces 64, 65 decreases with increasing distance from the end surface 62 and from the side edge 49 of the back-end-of-line stack 48. The truncated layer 60 may be tapered in an opposite direction from the tapering of the tapered section 14 of the waveguide core 12 and in the same direction as the tapering of the truncated layers 30, 40, 50. In an embodiment, the truncated layer 60 may be tapered over its entire length with a width dimension that varies with position along the longitudinal axis 61 and that has a minimum width at the end surface 63. In an embodiment, the width dimension of the truncated layer 60 may be equal to about 0.05 times to about 0.3 times the wavelength of the light (e.g., 1310 nanometers or 1550 nanometers) being received by the structure 10 from an optical fiber. In an embodiment, the truncated layer 60 may have a thickness equal to about 0.03 times to about 0.2 times the wavelength of the light being received by the structure 10 from the optical fiber. In an embodiment, the width dimension of the truncated layer 60 may vary based on a linear function to provide a trapezoidal shape. In an alternative embodiment, the width dimension of the truncated layer 60 may vary based on a non-linear function, such as a quadratic, parabolic, or exponential function.

The truncated layer 60 may be comprised of a dielectric material having the same composition as the dielectric material(s) of the truncated layers 30, 40, 50. In an embodiment, the truncated layer 60 may be comprised of either nitrogen-doped silicon carbide or hydrogenated nitrogen-doped silicon carbide. In an alternative embodiment, the truncated layer 60 may be comprised of a dielectric material having a refractive index that is greater than or equal to 1.65. The truncated layer 60 may be patterned from a layer that is formed by back-end-of-line processing in the back-end-of-line stack 48.

The truncated layer 60 is positioned in a given layer or level in the back-end-of-line stack 48 over the dielectric layer 20 on the substrate 22. The level of the truncated layer 60 differs in elevation above the dielectric layer 20 from the level of the waveguide core 12 and its tapered section 14 and differs in elevation above the dielectric layer 20 from the respective levels of the truncated layers 30, 40, 50. The narrower end surface 63 of the truncated layer 60 is positioned over the tapered section 14 of the waveguide core 12 and also over the truncated layers 30, 40, 50. The wider end surface 62 of the truncated layer 60 is positioned adjacent to the side edge 49 (FIG. 9) of the back-end-of-line stack 48 and the side edge 19 of the dielectric layer 20 and substrate 22.

The truncated layer 60 overlaps with the tapered section 14 of the waveguide core 12 by a distance, d4. In an embodiment, the distance, d4, may be less than the distance, d3, of overlap between the truncated layer 50 and the tapered section 14, less than the distance, d2, of overlap between the truncated layer 40 and the tapered section 14, and less than the distance, d1, of overlap between the truncated layer 30 and the tapered section 14. In an embodiment, the truncated layer 60 may be centered over the tapered section 14 of the waveguide core 12. In an embodiment, the truncated layer 60 may be centered over one or more of the truncated layers 30, 40, 50. In an embodiment, the truncated layer 60 may be centered over all of the truncated layers 30, 40, 50. In an embodiment, the truncated layer 60 may be centered over the truncated layers 30, 40, 50 and the tapered section 14 of the waveguide core 12.

Processing continues with the formation of additional dielectric layers 68 of the back-end-of-line stack 48 over the truncated layer 60 and dielectric layer 56. During an assembly phase, an optical fiber (e.g., a single-mode optical fiber) may be positioned adjacent to the back-end-of-line stack 48 and aligned with the structure 10.

In use, an optical fiber is positioned adjacent to the back-end-of-line stack 48 and affixed in alignment with the structure 10. Because of the location of the truncated layers 30, 40, 50, 60 of the structure 10 in the back-end-of-line stack 48, the optical fiber does not have to be placed into a groove formed in the back-end-of-line stack 48 and substrate 22. Instead, the optical fiber may be positioned in a butted relationship with the side edge 49 of the back-end-of-line stack 48 adjacent to the structure 10 without forming a groove for its placement.

The end surface 16 of the waveguide core 12 may be offset inward from the side edge 49 relative to the wider end surfaces 32, 42, 52, 62 of the truncated layers 30, 40, 50, 60. The wider end surfaces 32, 42, 52, 62 of the truncated layers 30, 40, 50, 60 are closer to the side edge 49 of the back-end-of-line stack 48 than the end surface 16 of the waveguide core 12. In the representative embodiment, the narrower end surfaces 33, 43, 53, 63 of the truncated layers 30, 40, 50, 60 are also offset relative to each other to provide a staggered arrangement. In the representative embodiment, the wider end surfaces 32, 42, 52, 62 of the truncated layers 30, 40, 50, 60 are coplanar or substantially coplanar at the facet defining the side edge 49 of the back-end-of-line stack 48 and providing the optical fiber interface with the structure 10. In an alternative embodiment, one or more of the end surfaces 32, 42, 52, 62 of the truncated layers 30, 40, 50, 60 may be offset relative to the other end surfaces 32, 42, 52, 62 of the truncated layers 30, 40, 50, 60.

In an embodiment, the widths of the truncated layers 30, 40, 60 may be less than the width of the truncated layer 50. In an embodiment, the width of the truncated layer 30 may be greater than the widths of the truncated layers 40, 60. In an embodiment, the width of the truncated layer 30 may be greater than the widths of the truncated layers 40, 60 and less than the width of the truncated layer 50. In an alternative embodiment, the relative widths of the truncated layers 30, 40, 50, 60 may differ.

The truncation and overlapping arrangement of the truncated layers 30, 40, 50, 60 may promote the efficient interlayer transmission of optical signals from the optical fiber to the tapered section 14 of the waveguide core 12. For example, the truncation of the truncated layers 30, 40, 50, 60 may function to suppress higher-order modes in the transferred laser light. The staggered arrangement of the truncated layers 30, 40, 50, 60 may also promote the efficient interlayer transmission of optical signals from the optical fiber to the tapered section 14 of the waveguide core 12. The waveguide core 12 and its tapered section 14 are positioned below the truncated layers 30, 40, 50, 60 in a level that is arranged between the dielectric layer 20 and the levels of the truncated layers 30, 40, 50, 60.

Figure 11:
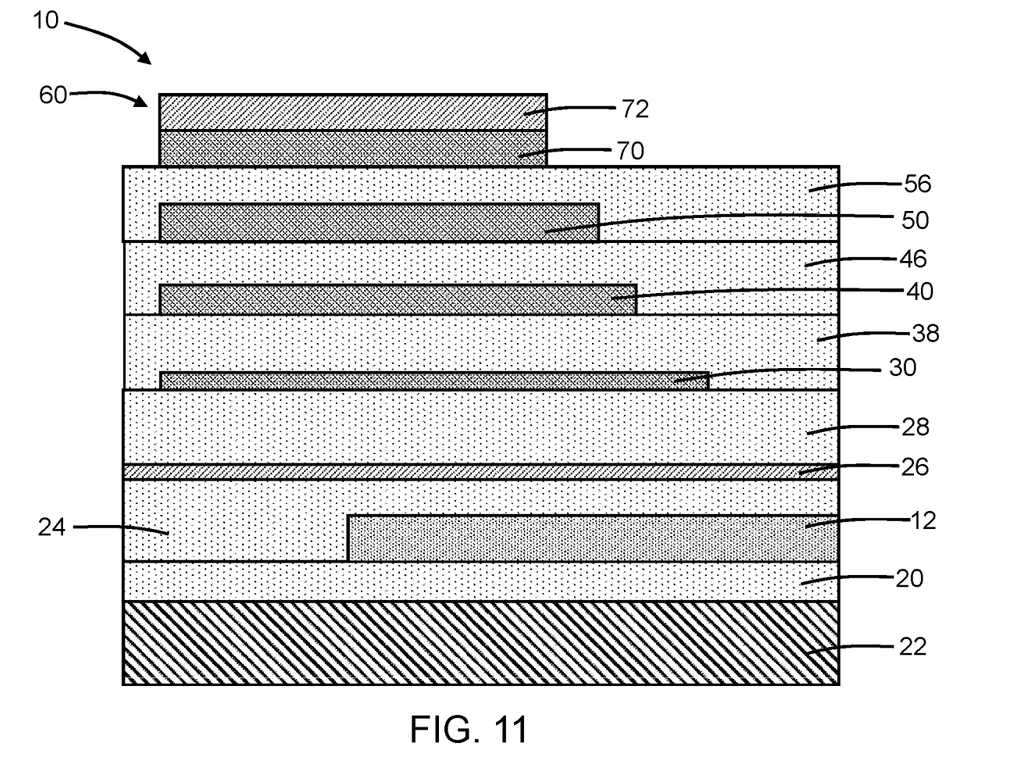
FIG. 11 is a cross-sectional view of a structure in accordance with alternative embodiments of the invention.

With reference to FIG. 11 and in accordance with alternative embodiments of the invention, the truncated layer 60 may be comprised of multiple dielectric materials formed by back-end-of-line processing. In an embodiment, the truncated layer 60 may include a lower portion 70 containing a dielectric material having a given composition and an upper portion 72 containing a dielectric material having a different composition. In an embodiment, the lower portion 70 of the truncated layer 60 may be comprised of either nitrogen-doped silicon carbide or hydrogenated nitrogen-doped silicon carbide. In an embodiment, the upper portion 72 of the truncated layer 60 may be comprised of silicon nitride. In an embodiment, the lower portion 70 of the truncated layer 60 may be comprised of either nitrogen-doped silicon carbide or hydrogenated nitrogen-doped silicon carbide, and the upper portion 72 of the truncated layer 60 may be comprised of silicon nitride.

Figure 12:
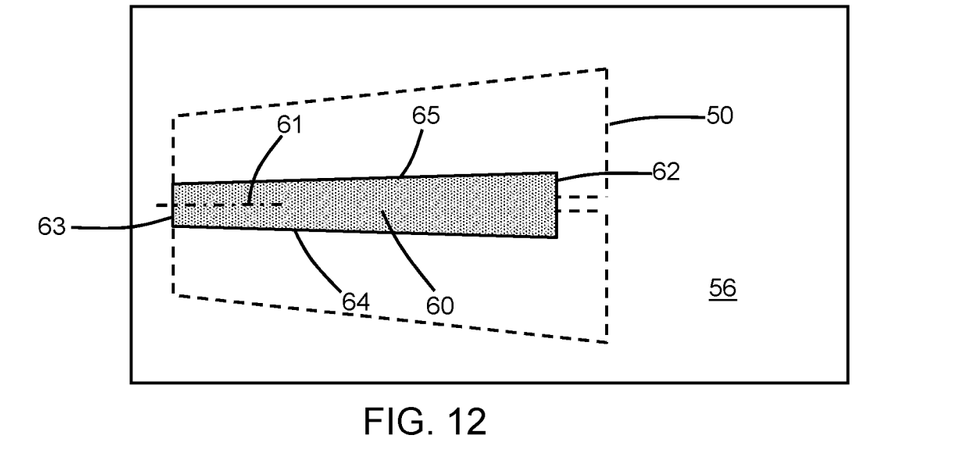
FIG. 12 is a top view of a structure in accordance with alternative embodiments of the invention.

With reference to FIG. 12 and in accordance with alternative embodiments of the invention, the directionality of the tapering of the truncated layers 30, 40, 50, 60 may be reversed such that the truncated layers 30, 40, 50, 60 taper in the same direction as the tapered section 14 of the waveguide core 12. The reversed direction of tapering of the truncated layers 50, 60 is depicted, as an example, in FIG. 11, and the other truncated layers 30, 40 that are positioned below the truncated layers 50, 60 may have a similar reversed tapering.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may overlap if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an edge coupler, the structure comprising:
   a first dielectric layer;
   a waveguide core on the first dielectric layer, the waveguide core including a tapered section;

a second dielectric layer over the first dielectric layer and the waveguide core; and a back-end-of-line stack including a side edge, a first truncated layer that is overlapped with the tapered section of the waveguide core, a second truncated layer that is overlapped with the tapered section of the waveguide core, a third dielectric layer positioned between the first truncated layer and the second truncated layer, and a third truncated layer that is overlapped with the tapered section of the waveguide core, the second dielectric layer positioned between the waveguide core and the first truncated layer, the first truncated layer, the second truncated layer, and the third truncated layer each having a first end surface adjacent to the side edge and a second end surface above the tapered section of the waveguide core, and the first truncated layer, the second truncated layer, and the third truncated layer each tapered from the first end surface to the second end surface.

2. The structure of claim 1 wherein the first truncated layer, the second truncated layer, and the third truncated layer comprise nitrogen-doped silicon carbide or hydrogenated nitrogen-doped silicon carbide.

3. The structure of claim 1 wherein the first truncated layer, the second truncated layer, and the third truncated layer comprise a dielectric material having a refractive index that is greater than or equal to 1.65.

4. The structure of claim 1 wherein the first truncated layer, the second truncated layer, and the third truncated layer are centered over the tapered section of the waveguide core.

5. The structure of claim 1 wherein the tapered section of the waveguide core includes an end surface that is spaced from the side edge of the back-end-of-line stack, and the end surface of the tapered section of the waveguide core is positioned beneath the first truncated layer, the second truncated layer, and the third truncated layer.

6. The structure of claim 5 wherein the first end surface of the first truncated layer, the first end surface of the second truncated layer, and the first end surface of the third truncated layer are positioned closer to the side edge of the back-end-of-line stack than the end surface of the tapered section of the waveguide core.

7. The structure of claim 6 wherein the first end surface of the first truncated layer, the first end surface of the second truncated layer, and the first end surface of the third truncated layer are coplanar.

8. The structure of claim 6 wherein the first end surface of the first truncated layer, the first end surface of the second truncated layer, and the first end surface of the third truncated layer are coplanar.

9. The structure of claim 6 wherein the first end surface of the first truncated layer, the first end surface of the second truncated layer, and the first end surface of the third truncated layer are offset relative to each other to provide a staggered arrangement.

10. The structure of claim 1 wherein the second truncated layer includes a slot extending from the first end surface to the second end surface, and the slot divides the second truncated layer into a first section and a second section.

11. The structure of claim 10 wherein the slot is centered over the tapered section of the waveguide core.

12. The structure of claim 1 wherein the third truncated layer includes a first portion comprising nitrogen-doped silicon carbide or hydrogenated nitrogen-doped silicon carbide and a second portion comprising silicon nitride.

13. The structure of claim 1 further comprising:
an optical fiber positioned in a butted relationship with the side edge of the back-end-of-line stack.

14. The structure of claim 1 wherein the first truncated layer has a first longitudinal axis, the second truncated layer has a second longitudinal axis aligned parallel to the first longitudinal axis, and the third truncated layer has a third longitudinal axis aligned parallel to the second longitudinal axis.

15. A method of forming a structure for an edge coupler, the method comprising:
forming a waveguide core on a first dielectric layer; and
forming a back-end-of-line stack over the first dielectric layer and the waveguide core,
wherein a second dielectric layer is formed over the first dielectric layer and the waveguide core, the back-end-of-line stack includes a side edge, a first truncated layer that is overlapped with a tapered section of the waveguide core, a second truncated layer that is overlapped with the tapered section of the waveguide core, a third dielectric layer positioned between the first truncated layer and the second truncated layer, and a third truncated layer that is overlapped with the tapered section of the waveguide core, the second dielectric layer is positioned between the waveguide core and the first truncated layer, the first truncated layer, the second truncated layer, and the third truncated layer each have a first end surface adjacent to the side edge and a second end surface above the tapered section of the waveguide core, and the first truncated layer, the second truncated layer, and the third truncated layer are each tapered from the first end surface to the second end surface.

16. The method of claim 15 wherein the first truncated layer, the second truncated layer, and the third truncated layer comprise nitrogen-doped silicon carbide or hydrogenated nitrogen-doped silicon carbide.

17. The method of claim 15 further comprising:
positioning an optical fiber in a butted relationship with the side edge of the back-end-of-line stack.

* * * * *